(12) United States Patent
Janssen et al.

(10) Patent No.: US 12,386,858 B2
(45) Date of Patent: Aug. 12, 2025

(54) DATA REPLICA CHANGE ANALYSIS

(71) Applicant: International Business Machines Corporation, Armonk, NY (US)

(72) Inventors: Travis Janssen, San Jose, CA (US); Brian D. Hatfield, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 18/509,522

(22) Filed: Nov. 15, 2023

(65) Prior Publication Data
US 2025/0156442 A1    May 15, 2025

(51) Int. Cl.
*G06F 16/27* (2019.01)
(52) U.S. Cl.
CPC .................................. *G06F 16/273* (2019.01)
(58) Field of Classification Search
None
See application file for complete search history.

(56) References Cited

U.S. PATENT DOCUMENTS

| | | | |
|---|---|---|---|
| 7,603,391 B1 * | 10/2009 | Federwisch | G06F 16/10 707/999.203 |
| 7,885,923 B1 * | 2/2011 | Tawri | G06F 11/2074 707/610 |
| 8,635,373 B1 | 1/2014 | Supramaniam et al. | |
| 9,483,366 B2 | 11/2016 | Brown et al. | |
| 9,516,615 B2 | 12/2016 | Stacey et al. | |
| 11,003,632 B2 | 5/2021 | Jewell et al. | |
| 11,301,431 B2 | 4/2022 | Jewell et al. | |
| 11,748,376 B1 * | 9/2023 | Wang | G06F 16/273 707/613 |
| 2015/0312300 A1 * | 10/2015 | Mosko | H04L 63/061 713/171 |
| 2021/0019236 A1 | 1/2021 | Attarde et al. | |
| 2021/0349856 A1 | 11/2021 | Prahlad et al. | |
| 2023/0115293 A1 | 4/2023 | Karr et al. | |

FOREIGN PATENT DOCUMENTS

CN     105740096 A     7/2016

OTHER PUBLICATIONS

Mrinal et al., Delta: A highly available, strongly consistent storage service using chain replication, May 4, 2022.
Wikipedia, Lamport Timestamp, printed on Aug. 25, 2023, https://en.wikipedia.org/wiki/Lamport_timestamp.

* cited by examiner

*Primary Examiner* — Scott A. Waldron
(74) *Attorney, Agent, or Firm* — Garg Law Firm, PLLC; Rakesh Garg; Michael O'Keefe (57) ABSTRACT

An embodiment enables a first machine to receive an asynchronous data update from a second machine, the asynchronous data update comprising a first stream of identifiers and a second stream of data, wherein the first stream of identifiers comprises a first identifier corresponding to a first data segment in the second stream of data. An embodiment analyzes, as a part of the asynchronous data update, the first stream of identifiers. An embodiment determines at a first time, responsive to the analyzing, that the first data segment corresponding to the first identifier has not arrived at the first machine by the first time. An embodiment updates, responsive to the determining at the first time, a record at the first machine with the first identifier. An embodiment updates the record at a second time, responsive to receiving the first data segment at the first machine at the second time.

20 Claims, 8 Drawing Sheets

DATA REPLICA CHANGE ANALYSIS

BACKGROUND

The present invention relates generally to data replication management. More particularly, the present invention relates to a method, system, and computer program for data replica change analysis.

In computing, a data replica is a replica, or copy, of a portion of data. Data replication involves storing data on multiple storage system, so as to ensure consistency between redundant resources, to improve reliability or fault tolerance, or to improve a time required to access the data. In some applications, data replication is performed synchronously, e.g., by writing two or more copies of the data to different storage devices (e.g., in a clustered file system) in parallel, thus providing always up-to-date redundant storage. In other applications, data replication is performed asynchronously, e.g., by accumulating, at a source machine, a batch of data to be replicated, then replicating the entire batch at another storage device in the same or in a destination machine (e.g., at another data center). Asynchronous data replicas are not always up to date. For example, if a source machine fails while a batch of data to be replicated is being accumulated, some of all of the data in the batch will not yet have been transmitted to the destination machine and could be lost. A recovery point objective (RPO) is the maximum acceptable amount of data loss after an unplanned data-loss incident. When an RPO is expressed in terms of time, RPO refers to the point in time elapsed since the most recent reliable backup—for example, five minutes or one day.

SUMMARY

The illustrative embodiments provide for data replica change analysis. An embodiment includes enabling a first machine to receive an asynchronous data update from a second machine, the asynchronous data update comprising a first stream of identifiers and a second stream of data, wherein the first stream of identifiers comprises a first identifier corresponding to a first data segment in the second stream of data. An embodiment includes analyzing, as a part of the asynchronous data update, the first stream of identifiers. An embodiment includes determining at a first time, responsive to the analyzing, that the first data segment corresponding to the first identifier has not arrived at the first machine by the first time. An embodiment includes updating, responsive to the determining at the first time, a record at the first machine with the first identifier. An embodiment includes updating the record at a second time, responsive to receiving the first data segment at the first machine at the second time. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

The illustrative embodiments recognize that treating an RPO as a time-based measurement means that the amount of un-replicated (and hence, potentially missing) data must be approximated. For example, one could approximate the amount of un-replicated data by multiplying the RPO (in a time unit, e.g., seconds, hours, or days) by an assumed data transmission rate to a replication site. However, this calculation assumes that a data transmission rate is constant, which is unlikely. In addition, approximating RPO using time and does not take factors other than transmission rate into account. For example, a destination machine might not have received some data because of a transmission error on a network connecting source and destination machines, the data might have arrived corrupted, or a storage device might have failed at the destination machine.

The illustrative embodiments also recognize that, as more than one replication destination is possible, knowledge of which replicated data is at which destination machine is important in planning and executing a recovery operation using the replicated data. However, current methods of determining which replicated data is at which destination machine require assuming that all replicated data arrived intact at a destination machine, or analyzing the data at each destination, then selecting a replica, and this can be time-consuming and error prone. Thus, the illustrative embodiments recognize that there is an unmet need to measure the amount of un-replicated data directly, and to determine which data is present at which particular destination machine.

The present disclosure addresses the deficiencies described above by providing a process (as well as a system, method, machine-readable medium, etc.) that enables a first machine to receive an asynchronous data update from a second machine; analyzes, as a part of the asynchronous data update, a first stream of identifiers; determines at a first time, responsive to the analyzing, that the first data segment corresponding to the first identifier has not arrived at the first machine by the first time; updates, responsive to the determining at the first time, a record at the first machine with the first identifier; and updates the record at a second time, responsive to receiving the first data segment at the first machine at the second time. Thus, the illustrative embodiments provide for data replica change analysis.

An illustrative embodiment enables a first machine (data replication machine) to receive an asynchronous data update from a second machine (source machine). The asynchronous data update includes a first stream of identifiers and a second stream of data. The first stream of identifiers includes at least one identifier, and each identifier includes an identifier of a particular block of data (i.e., a block identifier) and a version number of the particular block of data. Note that the first stream of identifiers does not include a copy of the data being identified. Instead, the identified data is sent separately, in the second stream of data. In particular, the second stream of data includes at least one portion of data, and the portion of data includes an identifier of a particular block of data (i.e., a block identifier), a version number of the particular block of data, and a data segment. The data segment includes the contents of the portion of data identified by the block identifier. One embodiment executes in the data replication machine. Another embodiment executes in a third machine and monitors first and second streams of identifiers received at the data replication machine.

An embodiment maintains two data structures, an in-sync data structure and an out-of-sync data structure (also referred to as an in-sync table and an out-of-sync table). The in-sync data structure holds one or more records of portions of data (in the second stream of data) received earlier than the portions' corresponding identifiers (in the first stream of identifiers). In one embodiment, each entry in the in-sync data structure includes a block identifier, a starting version, and an ending version. The out-of-sync data structure holds one or more records of portions of data (in the second stream of data) received later than the portions' corresponding identifiers (in the first stream of identifiers). In one embodiment, each entry in the out-of-sync data structure includes a block identifier, a starting version, and an ending version. In one embodiment, the in-sync and out-of-sync data structures are implemented as hash tables, a presently available data structuring technique. In another embodiment, the in-sync and out-of-sync data structures are implemented as trees, another presently available data structuring technique. In another embodiment, the in-sync and out-of-sync data structures are implemented using another presently available data structure configuration. The in-sync data structure need not be implemented using the same data structure configuration as the out-of-sync data structure.

As a part of an asynchronous data update, an embodiment analyzes the first stream of identifiers. In particular, an embodiment receives an identifier in the first stream of identifiers at a first time, and extracts a block identifier and a version number from the identifier. An embodiment determines whether the block identifier is present in the in-sync table, using a presently available technique specific to the data structure used to implement the in-sync table. In particular, if the in-sync table is implemented using a hash table, an embodiment computes a hash lookup key corresponding to the block identifier, and uses the computed hash lookup key to determine whether the block identifier is present in the in-sync table. If the block identifier is present in the in-sync table, a version of the data identified by the block identifier has already been received, but not necessarily all of the versions. Thus, an embodiment uses the version number in the identifier to determine whether all the versions of the block identifier's data tracked in the in-sync table have been received and accounted for. If yes, an embodiment deletes the block identifier's entry in the in-sync table. If not, an embodiment narrows a range of versions of the block identifier's data tracked in the in-sync table to exclude the version in the identifier currently being processed.

If, instead, the block identifier is not present in the in-sync table, this version of the data identified by the block identifier has not yet been received via the data stream. Thus, an embodiment determines whether the block identifier is present in the out-of-sync table, using a presently available technique specific to the data structure used to implement the in-sync table. If the block identifier is present in the out-of-sync table, a previous version of the data identified by the block identifier is also outstanding (i.e., has not yet been received), and an embodiment widens the range of data versions tracked in block identifier's entry in the out-of-sync table. If the block identifier is not present in the out-of-sync table, no previous versions of the data identified by the block identifier are outstanding (i.e., have not yet been received), and an embodiment adds an entry for the block identifier to the out-of-sync table, with a version range that includes only the version in the identifier being processed.

An embodiment analyzes the second stream of data. In particular, an embodiment receives an identifier in the second stream of data at a second time, and extracts a block identifier and a version number from the identifier. An embodiment determines whether the block identifier is present in the out-of-sync table, using a presently available technique specific to the data structure used to implement the out-of-sync table. In particular, if the out-of-sync table is implemented using a hash table, an embodiment computes a hash lookup key corresponding to the block identifier, and uses the computed hash lookup key to determine whether the block identifier is present in the out-of-sync table. If the block identifier is present in the out-of-sync table, a version of the data identified by the block identifier has already been received, but not necessarily all of the versions. Thus, an embodiment uses the version number in the identifier to determine whether all needed versions of the block identifier's data tracked in the out-of-sync table have been received and accounted for. If yes, an embodiment deletes the block identifier's entry in the out-of-sync table. If not, an embodiment narrows a range of versions of the block identifier's data tracked in the out-of-sync table to exclude the version in the identifier currently being processed.

If, instead, the block identifier is not present in the out-of-sync table, an identifier identifying this version of the data has not yet been received at the destination machine via the identifier stream. Thus, an embodiment determines whether this version of the data is already tracked in the in-sync table. If yes, an embodiment widens the range of versions of the block identifier's data tracked in the in-sync table to include the version in the data portion currently being processed. If not, an embodiment adds an entry for the block identifier to the in-sync table, with a version range that includes only the version in the data portion currently being processed.

The in-sync and out-of-sync tables described herein use memory space efficiently because the tables only require memory to track out-of-sync and in-sync identifiers for the transition time until the other stream transmits the corresponding data or identifier, and because multiple updates to the same block require that the block identifier only be stored once and at most two more numbers for start and end of range. The in-sync and out-of-sync tables described herein are time efficient by using a presently available associative array, map, or hash table data structure keyed by the block identifier.

An embodiment uses the current contents of the in-sync and out-of-sync tables to report a replication status, periodically or in response to a request. In particular, if the request is to report all currently missing (i.e., unreceived) data, an embodiment reports the block identifiers and corresponding version ranges for all the entries in the out-of-sync table, as all of these entries are records of identifiers for which corresponding data was not received. For example, if there is a communications loss between source and destination machines, once communications are restored a source machine can request the replication status, and use the resulting report to resend data that did failed to arrive at the destination machine due to the communication loss. Another embodiment reports a replication status including a current state of both the in-sync and out-of-sync tables, for use in monitoring how closely the identifier stream and data stream are tracking each other. Other requests and replication status data are also possible and contemplated within the scope of the illustrative embodiments.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
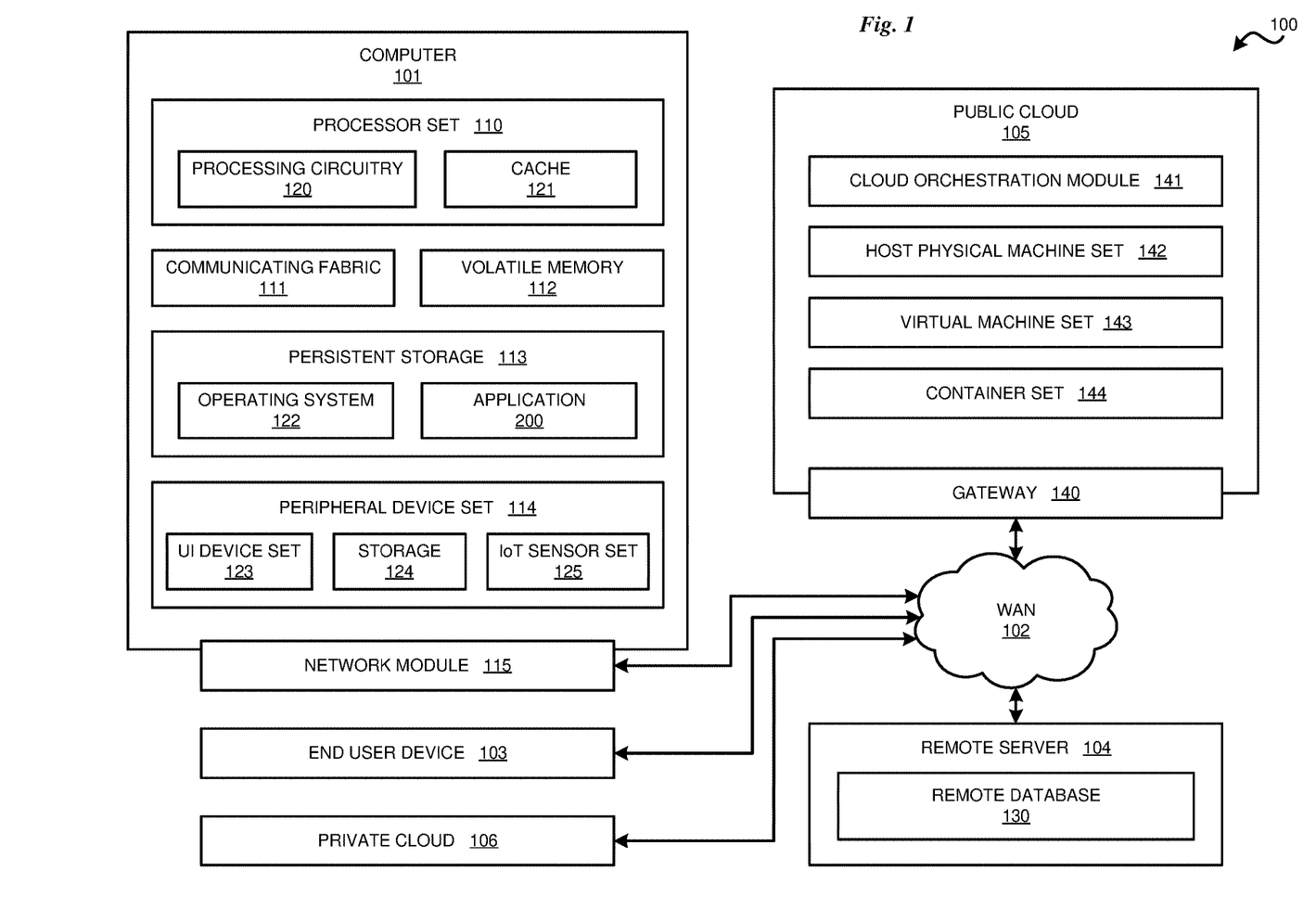
FIG. 1 depicts a block diagram of a computing environment in accordance with an illustrative embodiment.

With reference to FIG. 1, this figure depicts a block diagram of a computing environment 100. Computing environment 100 contains an example of an environment for the execution of at least some of the computer code involved in performing the inventive methods, such as data replica change analysis implemented in application 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
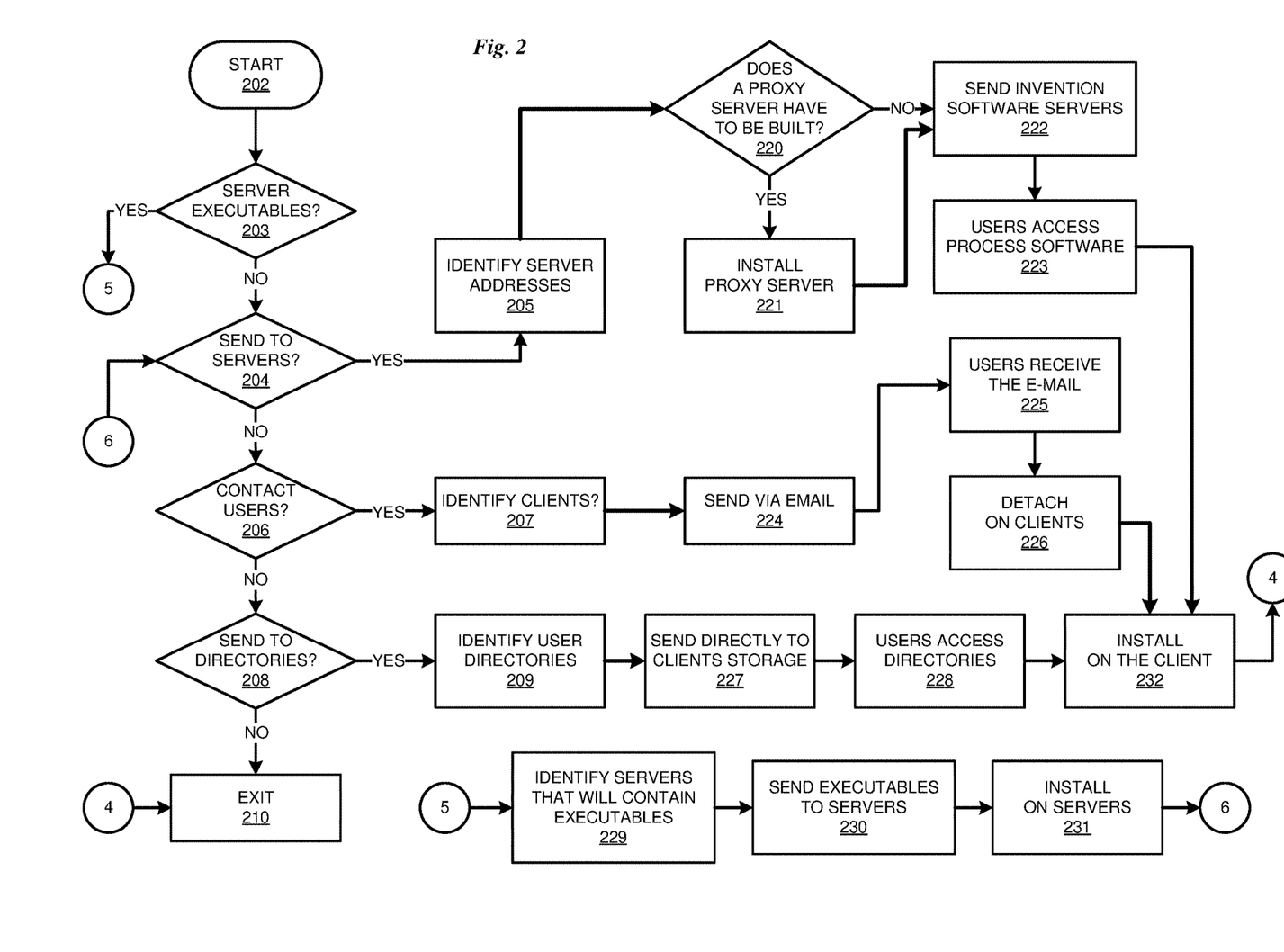
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing data replica change analysis may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
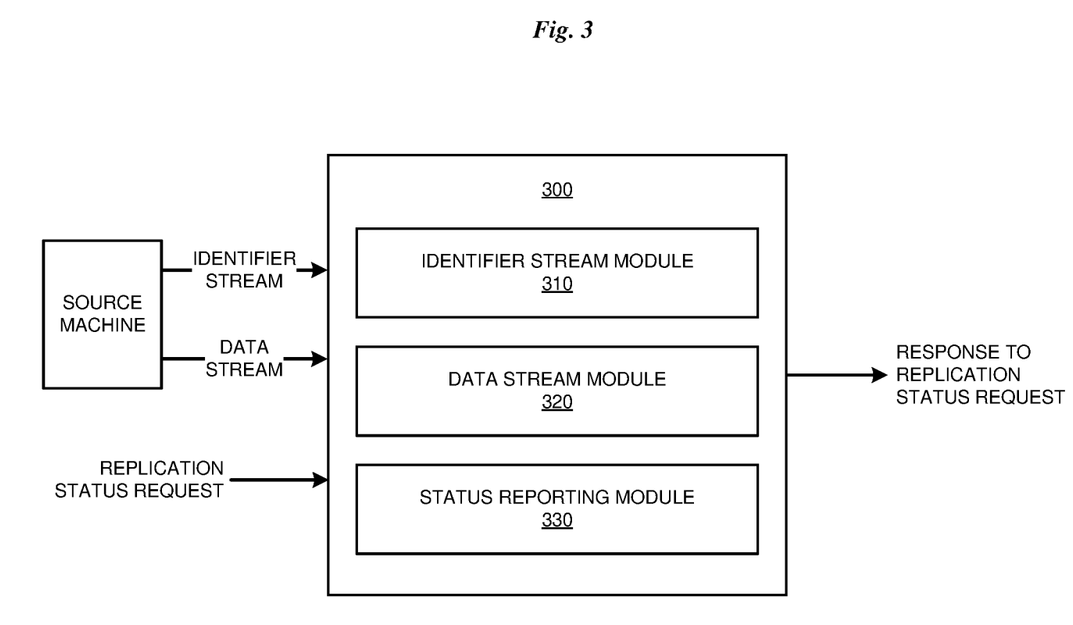
FIG. 3 depicts a block diagram of an example configuration for data replica change analysis in accordance with an illustrative embodiment.

With reference to FIG. 3, this figure depicts a block diagram of an example configuration for data replica change analysis in accordance with an illustrative embodiment. Application 300 is the same as application 200 in FIG. 1.

In the illustrated embodiment, application 300 enables a first machine (data replication machine) to receive an asynchronous data update from a second machine (source machine). The asynchronous data update includes a first stream of identifiers and a second stream of data. The first stream of identifiers includes at least one identifier, and each identifier includes an identifier of a particular block of data (i.e., a block identifier) and a version number of the particular block of data. Note that the first stream of identifiers does not include a copy of the data being identified. Instead, the identified data is sent separately, in the second stream of data. In particular, the second stream of data includes at least one portion of data, and the portion of data includes an identifier of a particular block of data (i.e., a block identifier), a version number of the particular block of data, and a data segment. The data segment includes the contents of the portion of data identified by the block identifier. One implementation of application 300 executes in the data replication machine. Another implementation of application 300 executes in a third machine and monitors first and second streams of identifiers received at the data replication machine.

Application 300 maintains two data structures, an in-sync data structure and an out-of-sync data structure (also referred to as an in-sync table and an out-of-sync table). The in-sync data structure holds one or more records of portions of data (in the second stream of data) received earlier than the portions' corresponding identifiers (in the first stream of identifiers). In one implementation of application 300, each entry in the in-sync data structure includes a block identifier, a starting version, and an ending version. The out-of-sync data structure holds one or more records of portions of data (in the second stream of data) received later than the portions' corresponding identifiers (in the first stream of identifiers). In one implementation of application 300, each entry in the out-of-sync data structure includes a block identifier, a starting version, and an ending version. In one implementation of application 300, the in-sync and out-of-sync data structures are implemented as hash tables, a presently available data structuring technique. In another implementation of application 300, the in-sync and out-of-sync data structures are implemented as trees, another presently available data structuring technique. In another implementation of application 300, the in-sync and out-of-sync data structures are implemented using another presently available data structure configuration. The in-sync data structure need not be implemented using the same data structure configuration as the out-of-sync data structure.

As a part of an asynchronous data update, identifier stream module 310 analyzes the first stream of identifiers. In particular, module 310 receives an identifier in the first stream of identifiers at a first time, and extracts a block identifier and a version number from the identifier. Module 310 determines whether the block identifier is present in the in-sync table, using a presently available technique specific to the data structure used to implement the in-sync table. In particular, if the in-sync table is implemented using a hash table, module 310 computes a hash lookup key corresponding to the block identifier, and uses the computed hash lookup key to determine whether the block identifier is present in the in-sync table. If the block identifier is present in the in-sync table, a version of the data identified by the block identifier has already been received, but not necessarily all of the versions. Thus, module 310 uses the version number in the identifier to determine whether all the versions of the block identifier's data tracked in the in-sync table have been received and accounted for. If yes, module 310 deletes the block identifier's entry in the in-sync table. If not, module 310 narrows a range of versions of the block identifier's data tracked in the in-sync table to exclude the version in the identifier currently being processed.

If, instead, the block identifier is not present in the in-sync table, this version of the data identified by the block identifier has not yet been received via the data stream. Thus, module 310 determines whether the block identifier is present in the out-of-sync table, using a presently available technique specific to the data structure used to implement the in-sync table. If the block identifier is present in the out-of-sync table, a previous version of the data identified by the block identifier is also outstanding (i.e., has not yet been received), and module 310 widens the range of data versions tracked in block identifier's entry in the out-of-sync table. If the block identifier is not present in the out-of-sync table, no previous versions of the data identified by the block identifier are outstanding (i.e., have not yet been received), and module 310 adds an entry for the block identifier to the out-of-sync table, with a version range that includes only the version in the identifier being processed.

Data stream module 320 analyzes the second stream of data. In particular, module 320 receives an identifier in the second stream of data at a second time, and extracts a block identifier and a version number from the identifier. Module 320 determines whether the block identifier is present in the out-of-sync table, using a presently available technique specific to the data structure used to implement the out-of-sync table. In particular, if the out-of-sync table is implemented using a hash table, module 320 computes a hash lookup key corresponding to the block identifier, and uses the computed hash lookup key to determine whether the block identifier is present in the out-of-sync table. If the block identifier is present in the out-of-sync table, a version of the data identified by the block identifier has already been received, but not necessarily all of the versions. Thus, module 320 uses the version number in the identifier to determine whether all needed versions of the block identifier's data tracked in the out-of-sync table have been received and accounted for. If yes, module 320 deletes the block identifier's entry in the out-of-sync table. If not, module 320 narrows a range of versions of the block identifier's data tracked in the out-of-sync table to exclude the version in the identifier currently being processed.

If, instead, the block identifier is not present in the out-of-sync table, an identifier identifying this version of the data has not yet been received at the destination machine via the identifier stream. Thus, module 320 determines whether this version of the data is already tracked in the in-sync table. If yes, module 320 widens the range of versions of the block identifier's data tracked in the in-sync table to include the version in the data portion currently being processed. If not, module 320 adds an entry for the block identifier to the in-sync table, with a version range that includes only the version in the data portion currently being processed.

Status reporting module 330 uses the current contents of the in-sync and out-of-sync tables to report a replication status, periodically or in response to a request. In particular, if the request is to report all currently missing (i.e., unreceived) data, module 330 reports the block identifiers and corresponding version ranges for all the entries in the out-of-sync table, as all of these entries are records of identifiers for which corresponding data was not received. Another implementation of module 330 reports a replication status including a current state of both the in-sync and out-of-sync tables, for use in monitoring how closely the identifier stream and data stream are tracking each other. Other requests and replication status data are also possible.

Figure 4:
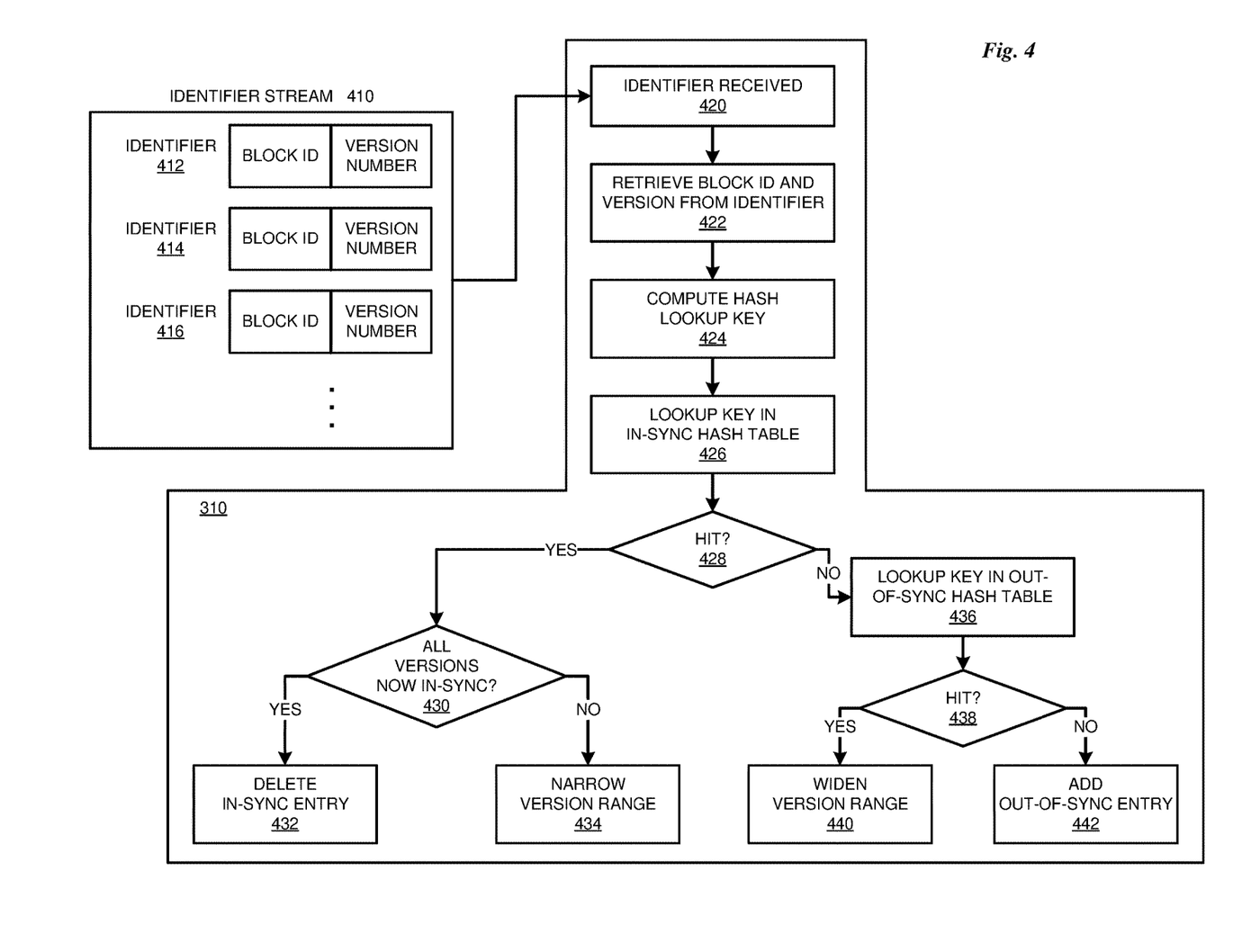
FIG. 4 depicts additional detail of the operation of identifier stream module 310 in an example configuration for data replica change analysis in accordance with an illustrative embodiment.

With reference to FIG. 4, this figure depicts additional detail of the operation of identifier stream module 310 in an example configuration for data replica change analysis in accordance with an illustrative embodiment. Identifier stream module 310 is the same as identifier stream module 310 in FIG. 3.

Identifier stream module 310 receives identifier stream 410. Identifier stream 410 includes identifiers 412, 414, and 416. Identifiers 412, 414, and 416 each include an identifier of a particular block of data (i.e., a block identifier) and a version number of the particular block of data. Note that identifiers in identifier stream 410 do not include a copy of the data being identified.

Identifier stream module 310 analyzes identifier stream 410. In particular, module 310 (at block 420) receives an identifier in identifier stream 410 at a first time, and (at block 422) extracts a block identifier and a version number from the identifier. As the illustrated implementation of module 310 implements the in-sync and out-of-sync tables using a hash table, module 310 (at block 424) computes a hash lookup key corresponding to the block identifier, and (at block 426) uses the computed hash lookup key to determine whether the block identifier is present in the in-sync table. If the block identifier is present in the in-sync table ("YES" path of block 428), a version of the data identified by the block identifier has already been received, but not necessarily all of the versions. Thus, at block 430, module 310 uses the version number in the identifier to determine whether all the versions of the block identifier's data tracked in the in-sync table have been received and accounted for. If yes, at block 432 module 310 deletes the block identifier's entry in the in-sync table. If not, at block 434 module 310 narrows a range of versions of the block identifier's data tracked in the in-sync table to exclude the version in the identifier currently being processed.

If, instead, the block identifier is not present in the in-sync table ("NO" path of block 428), this version of the data identified by the block identifier has not yet been received via the data stream. Thus, at block 436 module 310 determines whether the block identifier is present in the out-of-sync table, using a presently available technique specific to the data structure used to implement the in-sync table. If the block identifier is present in the out-of-sync table ("YES" path of block 438), a previous version of the data identified by the block identifier is also outstanding (i.e., has not yet been received), and at block 440 module 310 widens the range of data versions tracked in block identifier's entry in the out-of-sync table. If the block identifier is not present in the out-of-sync table ("NO" path of block 438), no previous versions of the data identified by the block identifier are outstanding (i.e., have not yet been received), and at block 442 module 310 adds an entry for the block identifier to the out-of-sync table, with a version range that includes only the version in the identifier being processed.

Figure 5:
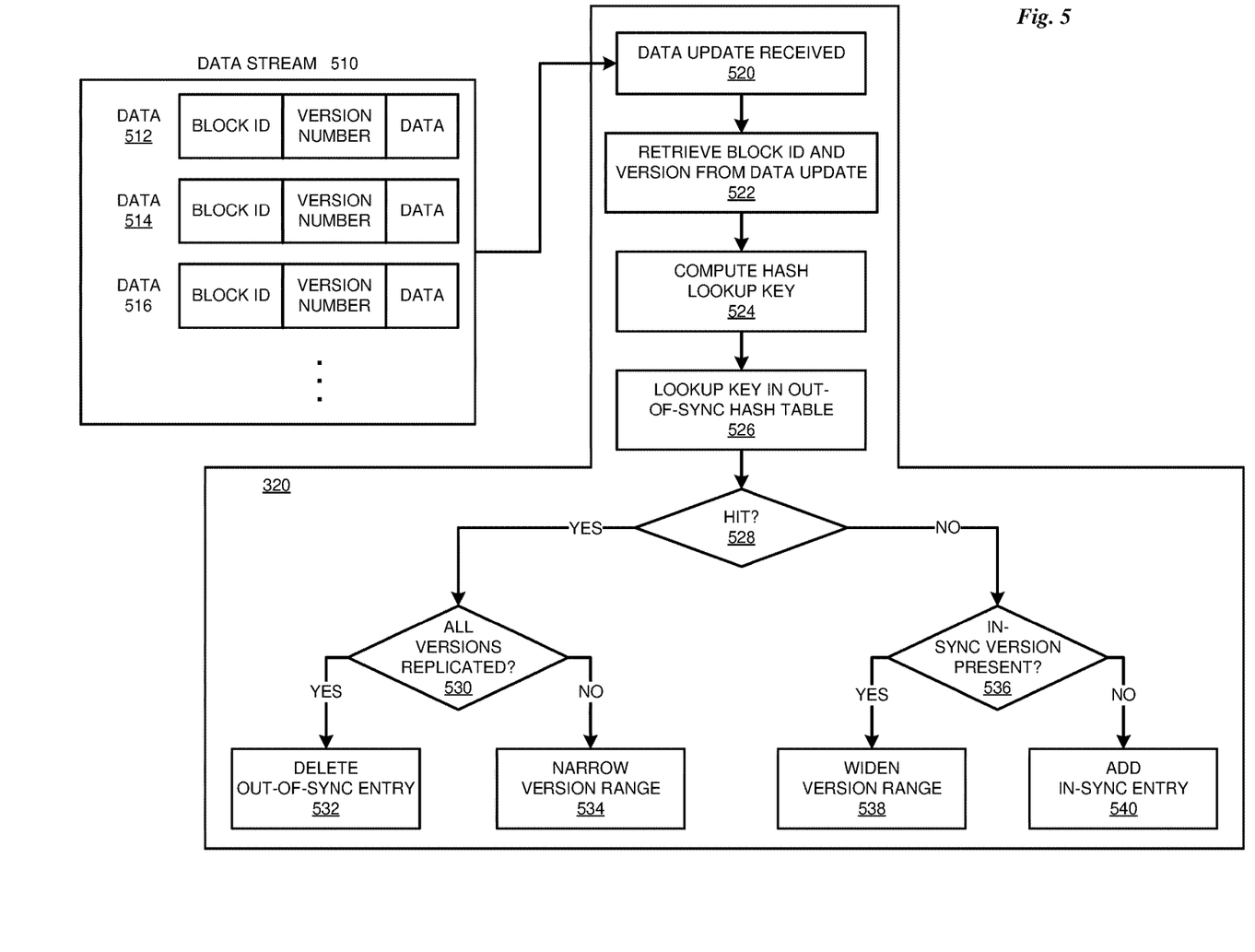
FIG. 5 depicts; additional detail of the operation of data stream module 320 in an example configuration for data replica change analysis in accordance with an illustrative embodiment

With reference to FIG. 5, this figure depicts additional detail of the operation of data stream module 320 in an example configuration for data replica change analysis in accordance with an illustrative embodiment. Data stream module 320 is the same as data stream module 320 in FIG. 3.

Data stream module 310 receives data stream 510. Data stream 510 includes data 512, 514, and 516. Data 512, 514, and 516 each include at least one portion of data, and the portion of data includes an identifier of a particular block of data (i.e., a block identifier), a version number of the particular block of data, and a data segment. The data segment includes the contents of the portion of data identified by the block identifier.

Data stream module 320 analyzes the second stream of data. In particular, module 320 (at block 520) receives data in data stream 510, and (at block 522) extracts a block identifier and a version number. Module 320 (at block 524) computes a hash lookup key corresponding to the block identifier, and (at block 526) uses the computed hash lookup key to determine whether the block identifier is present in the out-of-sync table. If the block identifier is present in the out-of-sync table ("YES" path of block 528), a version of the data identified by the block identifier has already been received, but not necessarily all of the versions. Thus, at block 530 module 320 uses the version number in the identifier to determine whether all needed versions of the block identifier's data tracked in the out-of-sync table have been received and accounted for. If yes, at block 532 module 320 deletes the block identifier's entry in the out-of-sync table. If not, at block 534 module 320 narrows a range of versions of the block identifier's data tracked in the out-of-sync table to exclude the version in the identifier currently being processed.

If, instead, the block identifier is not present in the out-of-sync table ("NO" path of block 528), an identifier identifying this version of the data has not yet been received at the destination machine via the identifier stream. Thus, at block 536 module 320 determines whether this version of the data is already tracked in the in-sync table. If yes, at block 538 module 320 widens the range of versions of the block identifier's data tracked in the in-sync table to include the version in the data portion currently being processed. If not, at block 540 module 320 adds an entry for the block identifier to the in-sync table, with a version range that includes only the version in the data portion currently being processed.

Figure 6:
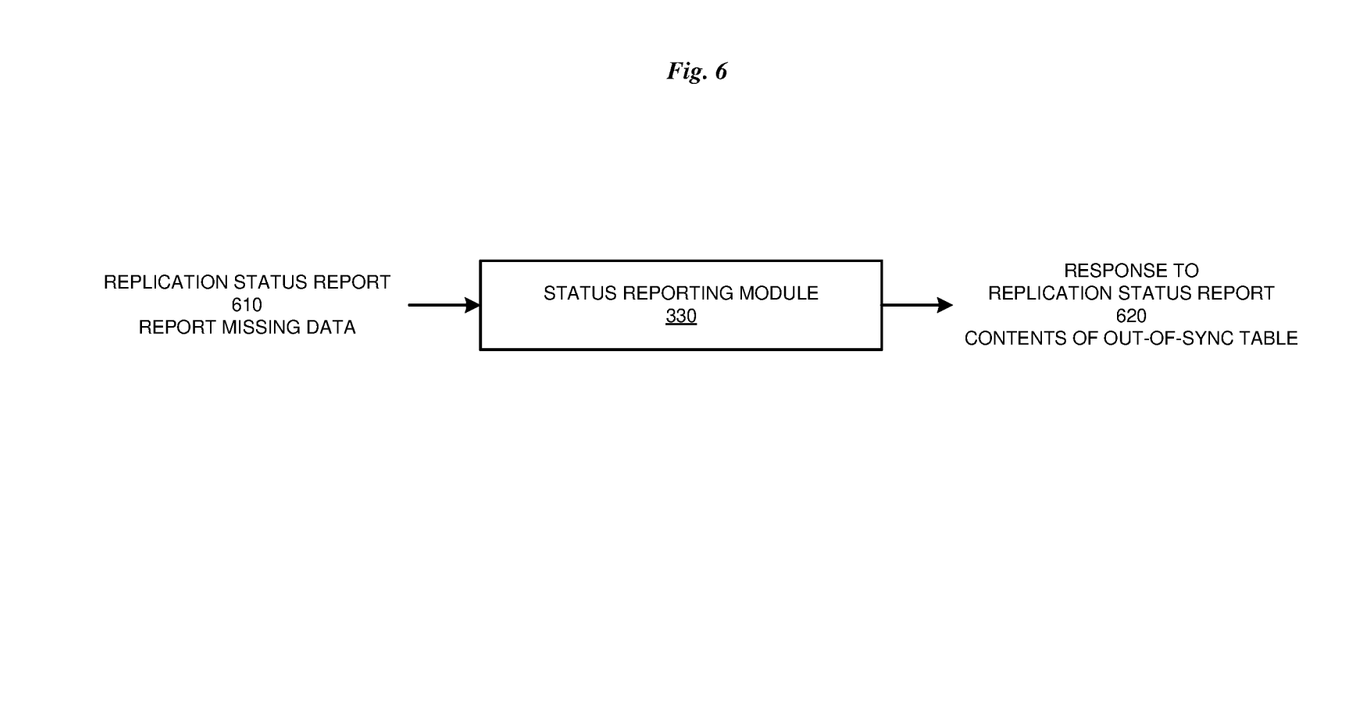
FIG. 6 depicts an example of data replica change analysis in accordance with an illustrative embodiment.

With reference to FIG. 6, this figure depicts an example of data replica change analysis in accordance with an illustrative embodiment. Status reporting module 330 is the same as status reporting module 330 in FIG. 3. The example can be executed using application 300 in FIG. 3.

As depicted, status reporting module 330 receives replication status request 610, a request to report missing data. In response, status reporting module 330 produces response to replication status request 620, the current contents of the out-of-sync table.

Figure 7:
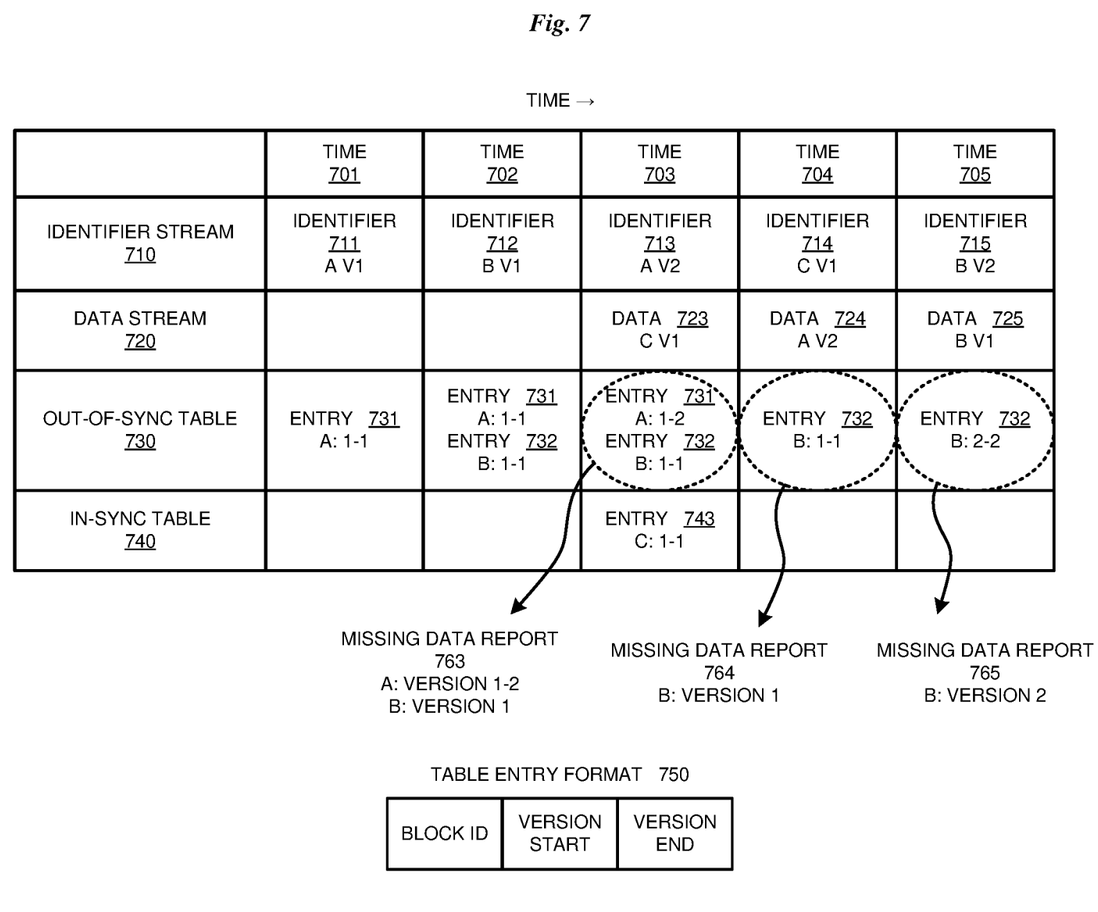
FIG. 7 depicts another example of data replica change analysis in accordance with an illustrative embodiment.

With reference to FIG. 7, this figure depicts another example of data replica change analysis in accordance with an illustrative embodiment. The example can be executed using application 300 in FIG. 3.

In particular, FIG. 7 depicts portions of identifier stream 710, data stream 720, out-of-sync table 730, and in-sync table 740 at times 701, 702, 703, and 704. Time increases from leftmost to rightmost column, so that time 701 is the earliest time, followed by time 702, then time 703, and time 704. Thus, time 704 is the latest time. Entries in out-of-sync table 730 and in-sync table 740 follow the format depicted in table entry format 750, including a block identifier, a starting version, and an ending version.

At time 701, identifier 711, including version 1 of data block A, is received in identifier stream 710. Out-of-sync table 730, and in-sync table 740 are currently empty, and thus there is no entry for data block A in either table. As a result, entry 731 is added to out-of-sync table 730, including data block A and a version range of 1-1.

At time 702, identifier 712, including version 1 of data block B, is received in identifier stream 710. In-sync table 740 is still empty, and out-of-sync table 730 does not include an entry for data block B. As a result, entry 732 is added to out-of-sync table 730, including data block B and a version range of 1-1.

At time 703, identifier 713, including version 2 of data block A, is received in identifier stream 710. There is already an entry for data block A in out-of-sync table 730, and no entry for data block A in in-sync table 740. As a result, entry 731 in out-of-sync table 730 is updated to include a version range of 1-2. Missing data report 763, generated at time 703, includes the current contents of out-of-sync table 730: entries 731 and 732.

Also at time 703, data 723, including version 1 of data block C, is received in data stream 720. There is no entry for data block C in out-of-sync table 730 or in-sync table 740. As a result, entry 743 is added to in-sync table 740, including data block C and a version range of 1-1.

At time 704, identifier 714, including version 1 of data block C, is received in identifier stream 710. The data for version 1 of data block C has already been received, as indicated by entry 743 in in-sync table 740. As a result, entry 743 is removed from in-sync table 740.

Also at time 704, data 724, including version 2 of data block A, is received in data stream 720. According to entry 731 in out-of-sync table 730, receiving version 2 of data block A means that of data block A is now up to date (as version 2 supersedes version 1). As a result, entry 731 is removed from out-of-sync table 730. Missing data report 764, generated at time 704, includes the current contents of out-of-sync table 730: entry 732.

At time 705, identifier 715, including version 2 of data block B, is received in identifier stream 710. Also at time 705, data 725, including version 1 of data block B, is received in data stream 720. As a result, entry 732 in out-of-sync table 730 is updated to remove version 1 and add version 2, and now includes a version range of 2-2. Missing data report 765, generated at time 705, includes the current contents of out-of-sync table 730: entry 732.

Figure 8:
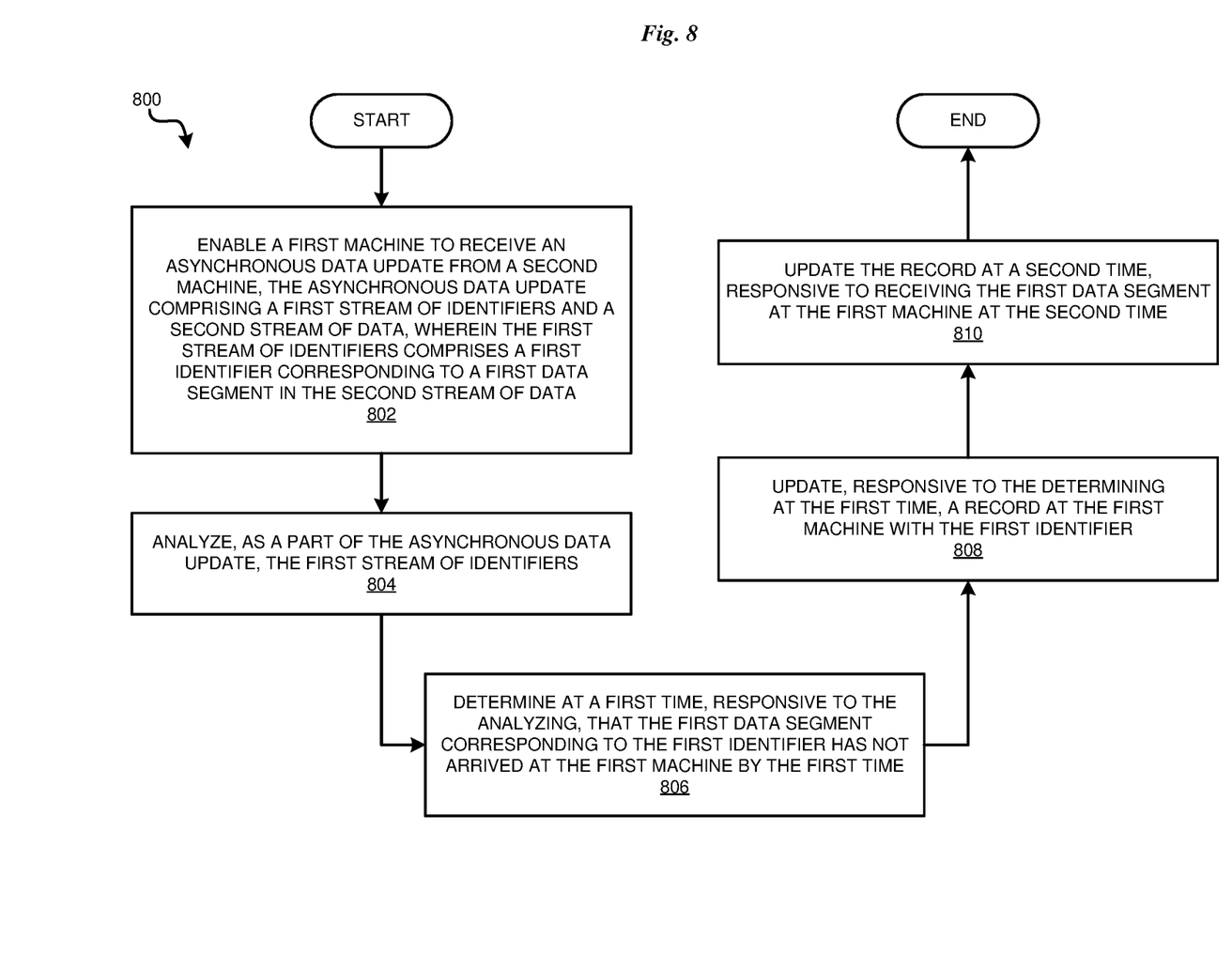
FIG. 8 depicts a flowchart of an example process for data replica change analysis in accordance with an illustrative embodiment.

With reference to FIG. 8, this figure depicts a flowchart of an example process for data replica change analysis in accordance with an illustrative embodiment. Process 800 can be implemented in application 300 in FIG. 3.

In the illustrated embodiment, at block 802, the process enables a first machine to receive an asynchronous data update from a second machine, the asynchronous data update comprising a first stream of identifiers and a second stream of data, wherein the first stream of identifiers comprises a first identifier corresponding to a first data segment in the second stream of data. At block 804, the process analyzes, as a part of the asynchronous data update, the first stream of identifiers. At block 806, the process determines at a first time, responsive to the analyzing, that the first data segment corresponding to the first identifier has not arrived at the first machine by the first time. At block 808, the process updates, responsive to the determining at the first time, a record at the first machine with the first identifier. At block 810, the process updates the record at a second time, responsive to receiving the first data segment at the first machine at the second time. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    enabling a first machine to receive an asynchronous data update from a second machine, the asynchronous data update comprising a first stream of identifiers and a second stream of data, wherein the first stream of identifiers comprises a first identifier corresponding to a first data segment in the second stream of data;

analyzing, as a part of the asynchronous data update, the first stream of identifiers;

determining at a first time, responsive to the analyzing, that the first data segment corresponding to the first identifier has not arrived at the first machine by the first time;

updating, responsive to the determining at the first time, a record at the first machine with the first identifier; and updating the record at a second time, responsive to receiving the first data segment at the first machine at the second time.

2. The computer-implemented method of claim 1, wherein each identifier in the first stream of identifiers comprises a block identifier and a version number, the block identifier identifying a data segment in the second stream of data.

3. The computer-implemented method of claim 2, wherein determining that the first data segment corresponding to the first identifier has not arrived at the first machine by the first time comprises:

determining that the block identifier of the first identifier is absent from an in-sync table.

4. The computer-implemented method of claim 2, wherein updating the record at the first machine with the first identifier comprises:

adding the block identifier of the first identifier to an out-of-sync table.

5. The computer-implemented method of claim 2, wherein updating the record at the first machine with the first identifier comprises:

widening, using the version number of the first identifier, a version range of an existing entry of the block identifier of the first identifier in an out-of-sync table.

6. The computer-implemented method of claim 2, wherein updating the record at the second time, responsive to receiving the first data segment at the first machine at the second time, comprises:

deleting the block identifier of the first identifier from an out-of-sync table.

7. The computer-implemented method of claim 2, wherein updating the record at the second time, responsive to receiving the first data segment at the first machine at the second time, comprises:

narrowing, using the version number of the first identifier, a version range of an existing entry of the block identifier of the first identifier in an out-of-sync table.

8. The computer-implemented method of claim 1, further comprising:

reporting, at a third time between the first time and the second time, responsive to a request for missing data at the first machine, the record.

9. A computer program product comprising one or more computer readable storage media, and program instructions collectively stored on the one or more computer readable storage media, the program instructions executable by a processor to cause the processor to perform operations comprising:

enabling a first machine to receive an asynchronous data update from a second machine, the asynchronous data update comprising a first stream of identifiers and a second stream of data, wherein the first stream of identifiers comprises a first identifier corresponding to a first data segment in the second stream of data;

analyzing, as a part of the asynchronous data update, the first stream of identifiers;

determining at a first time, responsive to the analyzing, that the first data segment corresponding to the first identifier has not arrived at the first machine by the first time;

updating, responsive to the determining at the first time, a record at the first machine with the first identifier; and updating the record at a second time, responsive to receiving the first data segment at the first machine at the second time.

10. The computer program product of claim 9, wherein the stored program instructions are stored in a computer readable storage device in a data processing system, and wherein the stored program instructions are transferred over a network from a remote data processing system.

11. The computer program product of claim 9, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

12. The computer program product of claim 9, wherein each identifier in the first stream of identifiers comprises a block identifier and a version number, the block identifier identifying a data segment in the second stream of data.

13. The computer program product of claim 12, wherein determining that the first data segment corresponding to the first identifier has not arrived at the first machine by the first time comprises:

determining that the block identifier of the first identifier is absent from an in-sync table.

14. The computer program product of claim 12, wherein updating the record at the first machine with the first identifier comprises:

adding the block identifier of the first identifier to an out-of-sync table.

15. The computer program product of claim 12, wherein updating the record at the first machine with the first identifier comprises:

widening, using the version number of the first identifier, a version range of an existing entry of the block identifier of the first identifier in an out-of-sync table.

16. The computer program product of claim 12, wherein updating the record at the second time, responsive to receiving the first data segment at the first machine at the second time, comprises:

deleting the block identifier of the first identifier from an out-of-sync table.

17. The computer program product of claim 12, wherein updating the record at the second time, responsive to receiving the first data segment at the first machine at the second time, comprises:

narrowing, using the version number of the first identifier, a version range of an existing entry of the block identifier of the first identifier in an out-of-sync table.

18. The computer program product of claim 9, further comprising:

reporting, at a third time between the first time and the second time, responsive to a request for missing data at the first machine, the record.

19. A computer system comprising a processor and one or more computer readable storage media, and program instructions collectively stored on the one or more computer readable storage media, the program instructions executable by the processor to cause the processor to perform operations comprising:
- enabling a first machine to receive an asynchronous data update from a second machine, the asynchronous data update comprising a first stream of identifiers and a second stream of data, wherein the first stream of identifiers comprises a first identifier corresponding to a first data segment in the second stream of data;
- analyzing, as a part of the asynchronous data update, the first stream of identifiers;
- determining at a first time, responsive to the analyzing, that the first data segment corresponding to the first identifier has not arrived at the first machine by the first time;
- updating, responsive to the determining at the first time, a record at the first machine with the first identifier; and
- updating the record at a second time, responsive to receiving the first data segment at the first machine at the second time.

20. The computer system of claim 19, wherein each identifier in the first stream of identifiers comprises a block identifier and a version number, the block identifier identifying a data segment in the second stream of data.

* * * * *